2,481,819

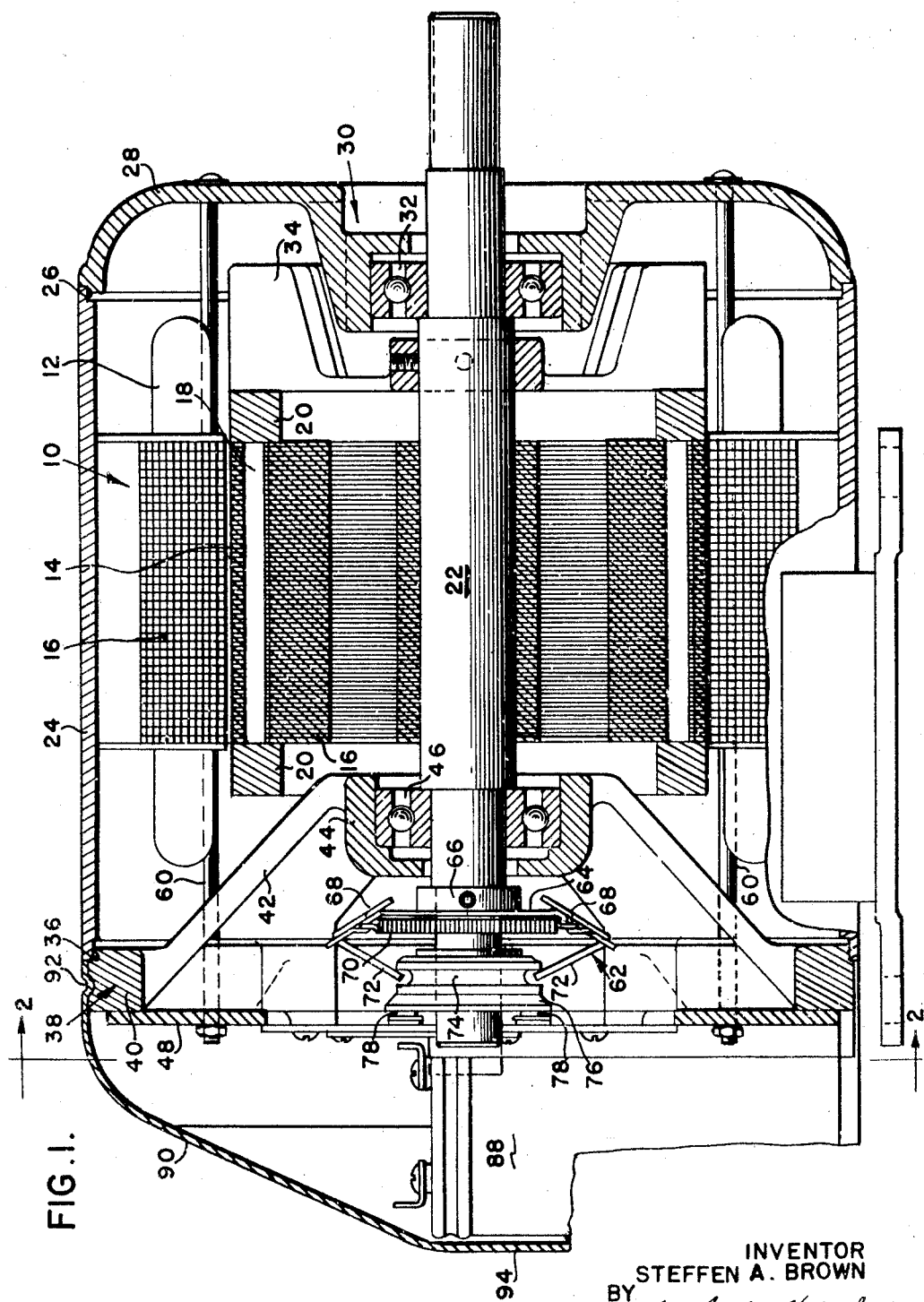
Sept. 13, 1949.   S. A. BROWN   2,481,819
MOTOR CONSTRUCTION
Filed Nov. 30, 1945   2 Sheets-Sheet 1
FIG. I.
INVENTOR
STEFFEN A. BROWN
BY Toulmin & Toulmin
ATTORNEYS Sept. 13, 1949.　　　　　S. A. BROWN　　　　　2,481,819
MOTOR CONSTRUCTION
Filed Nov. 30, 1945　　　　　　　　　　　　　2 Sheets-Sheet 2
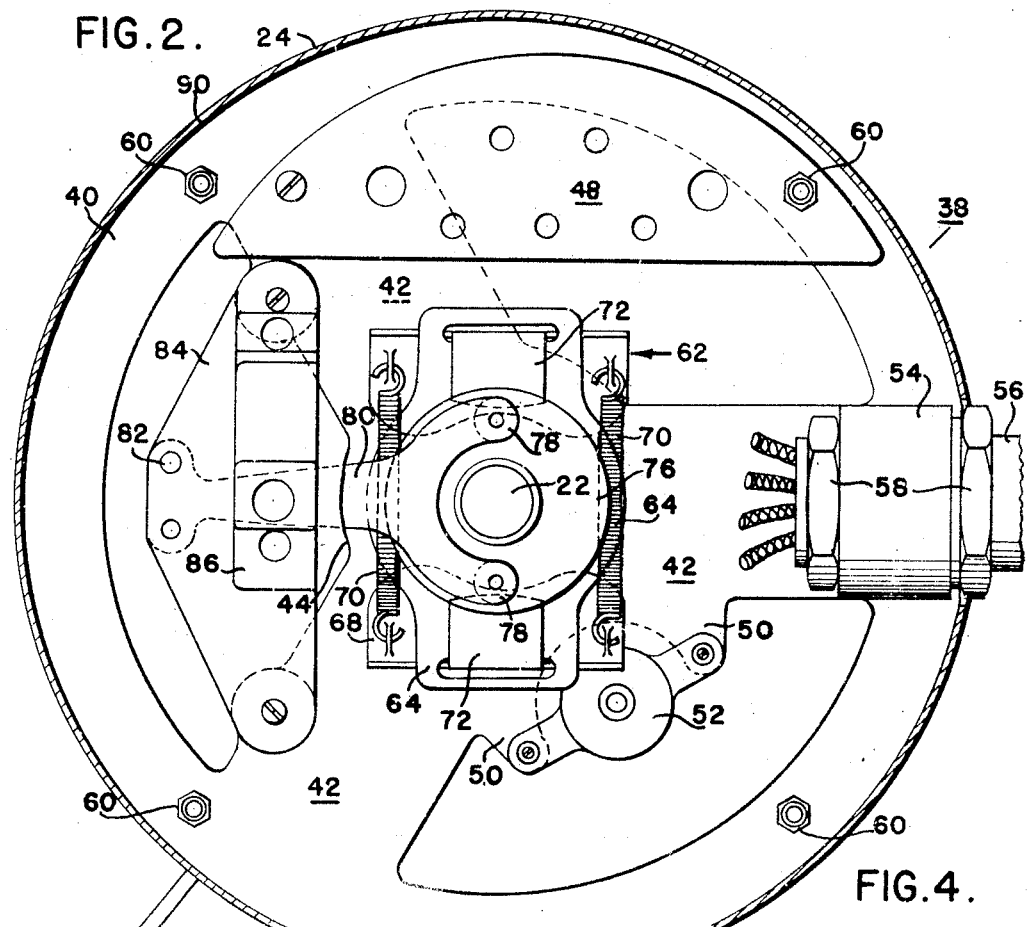
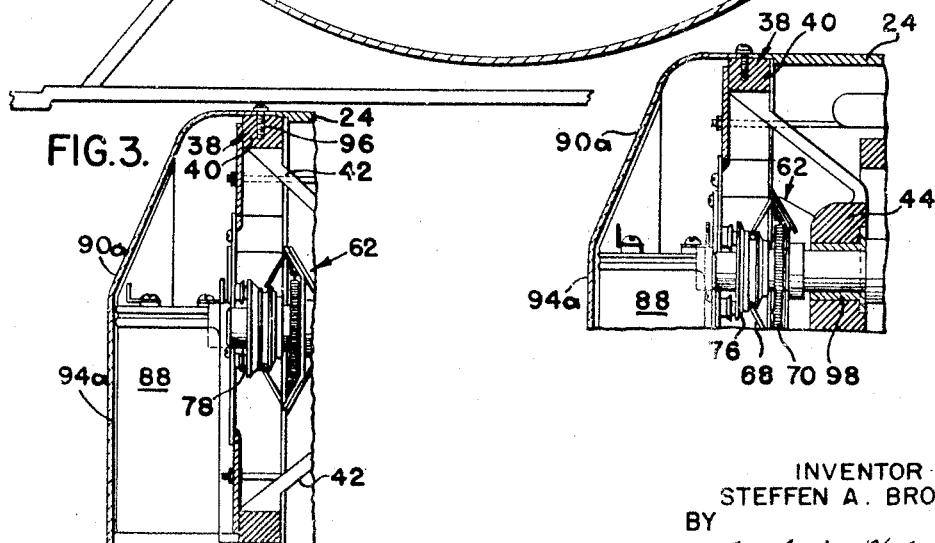
INVENTOR
STEFFEN A. BROWN
BY
*Toulmin & Toulmin*
ATTORNEYS Patented Sept. 13, 1949

UNITED STATES PATENT OFFICE 2,481,819

MOTOR CONSTRUCTION

Steffen A. Brown, Dayton, Ohio

Application November 30, 1945, Serial No. 632,018

5 Claims. (Cl. 172—36)

This invention relates to electrical apparatus and particularly to an improved construction for rotating electrical equipment such as generators and motors.

In the construction of generators and motors, and particularly in connection with the construction of fractional horsepower generators and motors, the rotating portion thereof is generally assembled on a shaft and thereafter the winding or rotor bars are mounted therein and the whole is enameled and baked and usually is machined in some manner. Then when the said rotating member is assembled with the stationary part of the motor or generator in a suitable frame, it is often necessary to straighten the aforementioned shaft to bring the rotor and the stationary part within which it rotates into exact concentricity.

One object of this invention is to provide a motor construction wherein the concentricity of the rotating and stationary parts are less dependent upon the supporting shaft.

Another object is to provide a particularly rigid support for the shaft of a motor or generator rotor.

In electric motors, especially the aforementioned fractional horsepower type, there are usually switches, condensers and other auxiliary equipment associated therewith which, heretofore, have been mounted either inside of the motor frame proper or completely outside thereof on the exterior of the motor frame.

It is another object of this invention to provide a motor construction wherein the switches, condensers, etc. are mounted on one of the end covers and enclosed by a thin auxiliary cover. This locates the switches externally of the motor proper and places them where they may be easily serviced or repaired while the auxiliary cover protects them from injury.

The objects of this invention are attained, in brief, by forming the end covers of the motor so that they project inwardly and support the bearings for the rotating member of the motor as closely adjacent the said member as they may be placed. This produces the aforementioned support closely adjacent the rotating member by which it is positively held in concentricity with the stationary member. The recessed end covers also provide a space for mounting switches and a terminal plate so that the electrical connections to the motor and switches are easily accessible and the switches may be serviced or replaced without dismantling either of the said covers from the motor frame.

These and other objects and advantages will become more apparent upon reference to the following specification taken together with the accompanying drawings in which:

Figure 1 is a longitudinal section through the preferred form of my invention;

Figure 2 is a transverse section taken substantially along the line 2—2 of Figure 1;

Figure 3 is a fragmentary view showing a transparent auxiliary and cover; and

Figure 4 is a fragmentary view showing how this invention is adapted for use in connection with a sleeve type bearing.

Referring to the drawings, there is shown a motor having a stationary portion at 10 which, according to usual practices, may comprise a laminated stator ring having the winding 12 associated therewith and the cylindrical bore 14 within which is rotatable the rotor 16.

The rotor 16 may be of any suitable type, but is preferably a squirrel cage type rotor having conducting bars 18 and the short circuiting end rings 20. The rotor 16 is pressed or keyed to a shaft 22 that extends out either end thereof to be journalled in the end member of the motor frame.

The motor frame structure consists of a frame ring 24 within which the stator or field structure 10 is pressed and which receives on either end suitable end members. According to this invention the right end of the frame 24 has a ledge at 26 that receives a corresponding ledge on the right end member 28. The end member 28 is centrally recessed as at 30 and mounts anti-friction bearing 32 that is received on the end of the shaft 22. The bearing 32 is located as close to the rotor 16 as possible and still allow room for the fan structure 34 which circulates cooling air through the motor in the usual manner.

The left end of the frame 24 also has a ledge as at 36 which receives a correspondingly shaped edge on the left end member 38. The member 38, best seen in Figure 2, comprises an outer annular portion 40, a plurality of radially and inwardly extending legs 42 and a central hub portion 44 that has a machined recess therein for receiving the anti-friction bearing 46. As in the case of the bearing 32, the bearing 46 is located as closely adjacent the rotor 16 as possible and the legs 42 and hub 44 are properly shaped to give the said bearing the proper support.

Within the conical recess defined by the end member 38 is mounted a terminal plate 48 which preferably comprises electrical insulating material and which may further consist of suitable terminal members to which may be attached the wires to the stator winding, to the power lines, and to the various switches associated with the motor.

Between one pair of the legs 42 there may be integral a pair of lugs 50 that mount therebetween a reset switch 52 which, when the motor is overloaded for a predetermined time, opens and interrupts the supply of electric power thereto.

For the purpose of connecting power lines to the motor, the end member 38 comprises an apertured lug 54 which is shaped to receive the end of a conduit 56 that may be secured in position by a pair of conduit nuts 58 placed on either side of the said lug. It will be apparent that the end member 38 may be located so that the lug 54 is positioned at the top or bottom or either side thereof for convenience in connecting with the conduit 56. To this end, the end members 28 and 38 are preferably secured against the frame 24 by the four through bolts indicated at 60. By removing the nuts on the through bolts at the left end of the motor, as viewed in Figure 1, the member 38 may be turned to any of its four positions.

The type motor with which it is desired to employ this type of construction is a split phase motor having a condenser for changing the phase angle of the power supply to the starting winding and a centrifugal switch for interrupting the starting winding when the motor comes up to speed. A suitable switch is indicated at 62, in Figures 1 and 2, and comprises a plate 64 mounted to rotate with the shaft 22 by a collar 66 and having pivoted in its outer ends the weights 68 that are continuously urged toward their Figure 1 position by the springs 70. The weights 68 include the inwardly projecting ends 72 that lie in a groove 74 in a collar 76 that is freely slidable on the end of the shaft 22.

The left face of the collar 76 bears against the ends 78 of a spring arm 80, the other end of which is fastened as at 82 to a plate 84 which is carried between a pair of the legs 42 of the frame 38. The plate 84 also carries a limit switch 86 whose actuating plunger extends through an aperture in the plate 84 to be engaged by the spring arm 80. The switch 86 is connected in circuit with the starting winding and with the condenser 88 and, when the motor is idle, completes the circuit to the starting winding and when the motor comes up to speed interrupts the said circuit.

It will be noted that, because of the configuration of the end frame member 28, the centrifugal switch 62 and the limit switch 86 may be mounted externally of the motor frame structure proper for easy access thereto.

In order to enclose the aforementioned switches and to mount the condenser 88 there is provided a thin sheet metal auxiliary cover indicated at 90 which snaps over the periphery of the annular portion 40 of the end frame member 38 and is retained thereon by the groove and recess indicated at 92. The cover 90 includes the drawn out portion 94 within which is mounted the condenser 88. By removing the cover 90, which may be done by snapping it from the periphery of the frame member 38, the condenser, the terminal block, the limit switch, the reset switch and the centrifugal switch may be inspected and, if necessary, replaced or repaired without dismantling the motor frame.

It will be evident that this is a distinct advantage where the motor is mounted so that only the one end is accessible or where it is mounted to have belts driven by a pulley on the pulley end of the shaft 22.

In Figure 3 there is a fragmentary view which illustrates a modified type of auxiliary cover which has particular advantages. In Figure 3 the auxiliary cover, indicated at 90a, is of a transparent material such as any of several plastic materials and which is similar to the cover 90 except that it is secured to the end frame member of the motor by screws 96. By utilizing a transparent auxiliary cover the condition of the switches and the operation thereof may be observed at any time without removing the said cover or disconnecting the motor.

It will be evident that this invention is not necessarily limited to the use of anti-friction bearings for supporting the rotor but may be equally well adapted to a motor comprising sleeve bearings as is shown in Figure 4. Figure 4 shows this invention with the anti-friction bearings replaced by a standard sleeve bearing at 98. The construction is otherwise the same as is shown in Figures 1 and 2.

It will be apparent that according to this invention the right end member may also include an auxiliary cover if desired. This would improve the appearance of the motor and the end member 28 could be identical with the end member 38, thereby permitting both of the said end members to be made from a single pattern.

It will be understood that this invention is susceptible to modification in order to adopt it to different usages and conditions and, accordingly, it is desired to comprehend such modifications within this invention as may fall within the scope of the appended claims.

I claim:

1. In an electric motor or generator; a stator; a rotor having shaft means extending therefrom; a frame supporting said stator and extending beyond both ends thereof; first and second end members telescoping said frame and secured thereto and having hubs that extend inwardly to journal said shaft means closely adjacent said rotor, one of said end members having an outer peripheral portion that engages said frame and a plurality of legs that connect said peripheral portion with its hub to form a conical recess for receiving switches and other operating auxiliaries, said one end member comprising a lug for connecting power lines to the motor and a cover secured about said peripheral portion and enclosing said recess.

2. In an electric motor or generator; a stator; a rotor having shaft means extending therefrom; a frame supporting said stator and extending beyond both ends thereof; first and second end members telescoping said frame and having hubs that extend inwardly to journal said shaft means closely adjacent said rotor and at opposite sides thereof, one of said end members having an outer annular portion that engages said frame and a plurality of radially and inwardly extending legs that connect said annular portion with its hub to form a conical recess for receiving switches and other operating auxiliaries, said one end member comprising a lug for connecting power lines to the motor, means for releasably securing said one end member about its periphery to said frame in several positions to vary the position of said lug and a cover secured about the periphery of said annular portion and enclosing said recess to provide a chamber adapted to receive a condenser.

3. In an electric motor or generator; a frame; an end member having an outer peripheral portion telescoping said frame, a hub lying inwardly of said frame, said end member having a plurality of radially and inwardly extending legs connecting said peripheral portion with said hub to form a conical recess, an apertured lug for receiving the end of a conduit carried by said end member, means for releasably securing said end member about its periphery to said frame in any one of four positions to vary the position of said lug and a cover member telescoping said peripheral portion from the side opposite said frame and enclosing said recess and the operating auxiliaries adapted to be mounted therein.

4. An electric motor or generator in accordance with claim 3 in which said securing means comprises elements spaced at equal angles about the periphery of said end member.

5. In an electric motor or generator; a frame; an end member having an outer peripheral portion telescoping said frame, a hub lying inwardly of said frame, said end member having a plurality of radially and inwardly extending legs connecting said peripheral portion with said hub to form a conical recess, an apertured lug for receiving the end of a conduit carried by said end member, means for releasably securing said end member about its periphery to said frame in any one of four positions to vary the position of said lug, said securing means comprises elements spaced at equal angles about the periphery of said end member and a transparent cover member telescoping said peripheral portion from the side opposite said frame and enclosing said recess and the operating auxiliaries adapted to be mounted therein, said cover member being retained in place by a cooperating ridge and groove on said member and peripheral portion to provide a quickly detachable connection.

STEFFEN A. BROWN.

REFERENCES CITED

The following references are of record in the file of this patent:

UNITED STATES PATENTS

| Number | Name | Date |
| --- | --- | --- |
| 630,333 | Dietrich | Aug. 8, 1899 |
| 940,698 | Lamme et al. | Nov. 23, 1909 |
| 1,245,762 | Neuland | Nov. 6, 1917 |
| 1,333,058 | Blake | Mar. 9, 1920 |
| 1,343,451 | Hertner | June 15, 1920 |
| 1,772,245 | Barrows | Aug. 5, 1920 |
| 1,826,054 | Chryst | Oct. 6, 1931 |
| 1,909,497 | Nielson | May 16, 1933 |
| 1,918,381 | Clarkson | July 18, 1933 |
| 2,017,255 | Norton | Oct. 15, 1935 |
| 2,024,726 | Ehrenfeld | Dec. 17, 1935 |
| 2,287,929 | Blankenbuehler | June 30, 1942 |
| 2,397,614 | Middleton | Apr. 2, 1946 |